United States Patent [19]

Gotou et al.

[11] Patent Number: 4,965,428
[45] Date of Patent: Oct. 23, 1990

[54] WIRE ELECTRICAL DISCHARGE MACHINING APPARATUS

[75] Inventors: Miyuki Gotou; Hiroshi Takeuchi, both of Aichi, Japan

[73] Assignee: Mitsubishi Denki Kabushiki Kaisha, Tokyo, Japan

[21] Appl. No.: 417,940

[22] Filed: Oct. 6, 1989

[30] Foreign Application Priority Data

Oct. 7, 1988 [JP] Japan ............................... 63-253078
Nov. 26, 1988 [JP] Japan ............................... 63-298786
Aug. 18, 1989 [JP] Japan ............................... 1-211473

[51] Int. Cl.⁵ .............................................. B23H 7/10
[52] U.S. Cl. .................................................. 219/69.12
[58] Field of Search ................... 219/69.12; 242/57, 75

[56] References Cited

U.S. PATENT DOCUMENTS 4,689,462 8/1987 Goto ................................. 219/69.13

FOREIGN PATENT DOCUMENTS 213428 10/1985 Japan ............................... 219/69.12
39127 2/1987 Japan .
287934 12/1987 Japan .
306832 12/1988 Japan ............................... 219/69.12

Primary Examiner—A. D. Pellinen
Assistant Examiner—Geoffrey S. Evans
Attorney, Agent, or Firm—Sughrue, Mion, Zinn, Macpeak & Seas

[57] ABSTRACT

A mechanism for preventing the loosening of a wire electrode of an EDM apparatus which is wound around a bobbin. The mechanism is provided with a loosening preventive device 5 including a presser plate 8 for pressing the outer periphery of the wire electrode against the bobbin by a spring pressure. The loosening preventive device presses the wire before electrical discharge and is separated from the bobbin when the electrical discharge is started. When the wire is broken or the wire feeding is stopped, the wire breaking or the feeding stop is detected and the presser plate is immediately pressed against the outer periphery of the wire so as to prevent the returning wire from bulging or backlashing out of the bobbin.

8 Claims, 11 Drawing Sheets

WIRE ELECTRICAL DISCHARGE MACHINING APPARATUS

BACKGROUND OF THE INVENTION

1. Field of the Invention

The present invention relates to a wire electrical discharge machining apparatus and, more particularly, to a mechanism for preventing a wire electrode wound around a wire bobbin from loosening.

2. Description of the Prior Art

FIG. 10 shows an example of the structure of a conventional wire electrical discharge machining apparatus. In FIG. 10, the wire electrical discharge machining apparatus body 1 is provided with a wire bobbin assembly 3 composed of a wire bobbin with a wire electrode 2 wound therearound.

FIG. 11 shows the details of the wire bobbin assembly 3. In FIG. 11, the wire bobbin 4 with the wire electrode 2 wound therearound is provided with a loosening preventive means 5 for preventing the wire electrode 2 wound around the wire bobbin 4 from loosening and bulging out of the outer periphery of the wire bobbin 4. A retaining means 6 for retaining the loosening preventive means 5 in a state of being apart from the wire bobbin 4 is secured to the wall surface of the wire bobbin assembly 3. The retaining means 6 is composed of, for example, a magnet. In the feeding route of the wire electrode 2, a wire tension reel 7 is provided which rotates in the direction of rewinding the wire electrode 2 while the torque thereof is controlled by an AC motor or the like. The returning force of the wire tension reel 7 provides the wire electrode 2 with a desired tension.

FIG. 12 shows the details of the loosening preventive means 5. In FIG. 12, the loosening preventive means 5 includes a wire presser plate 8 with the side surface thereof in contact with the outer peripheral surface of the wire electrode 2 which is wound around the wire bobbin 4, an arm 9 for supporting the wire presser plate 8, a hinge 10 with the one end thereof attached to the arm 9 and having a spring (not shown) for pressing the arm 9 to the side of the wire bobbin 4, and a fixture 11 for fixing the other end of the hinge 10 to the wire electric discharge machining apparatus body 1.

In FIGS. 11 and 12, the same numerals are provided for the elements which are the same as those shown in FIG. 10, and explanation thereof is omitted.

The operation of the conventional apparatus will now be explained. At the time of initial setting of the wire electrode 2 for starting electrical discharge machining, the loosening preventive means 5 is manually removed from the wall surface by the operator against the retaining force of the magnet of the retaining means 6. The loosening preventive means 5 presses the presser plate 8 against the outer winding peripheral surface of the wire electrode 2 around the wire bobbin 4, thereby stretching the wire electrode 2 in the feeding route while preventing the wire electrode 2 from loosening and bulging out of the wire bobbin 4. In this way, the initial setting is completed.

Electrical discharge machining is then started. If the presser plate 8 is in the state of being pressed against the outer winding peripheral surface of the wire electrode 2, the pressing force acts on the rotation of the wire bobbin 4 as a load so as to fluctuate the tension of the wire electrode 2, thereby making precise machining impossible. To prevent this, when electrical discharge machining is started, the loosening preventive means 5 is again separated from the wire bobbin 4 so as to be retained by the retaining means 6 and to eliminate the pressing force.

In a conventional wire electrical discharge machining apparatus having the above-described structure, it is necessary to keep the loosening preventing means 5 apart from the outer winding peripheral surface of the wire electrode 2 during electrical discharge machining. If the wire electrode 2 stops feeding during this period for some cause, the wire electrode 2 loosens and bulges out of the wire bobbin 4, thereby greatly impairing the operability. In this case, the conventional countermeasure is to prevent the loosening of the wire electrode by stopping the rotation of the wire tension reel 7 so as to prevent the wire electrode 2 from loosening due to the reverse rotation (rotation in the direction of rewinding). In order to stop the rotation of the wire tension reel 7, however, it is necessary to provide the reel 7 with a large braking force by, for example, applying a voltage in the reverse direction to the motor so as to obtain the maximum stopping torque and increasing the frictional resistance. For this reason, if the force applied to the reel 7 is small, the rotation of the reel 7 is not stopped completely due to the inertia, thereby loosening the wire electrode 2. On the other hand, if the force is too strong, the wire electrode 2 sometimes leaps up or the wire springs out of the reel 7 due to the reaction. Even after the reel 7 stops rotating, the wire bobbin 4 races due to the inertia or reversely rotates, thereby disturbing the winding of the wire electrode 2.

SUMMARY OF THE INVENTION

Accordingly, it is an object of the present invention to eliminate the above-described problems in the prior art and to provide a wire electric discharge machining apparatus which prevents the wire electrode wound around the wire bobbing from bulging out of the wire bobbin even when the feeding of the wire electrode is stopped due to, for example, breaking of the wire electrode.

To achieve this aim, a wire electrical discharge machining apparatus according to the present invention is provided with a loosening preventive means for pressing the outer winding peripheral surface of a wire electrode around a wire bobbin, a retaining means for retaining the loosening preventive means in the state of being apart from the wire bobbin, a wire feeding stop detecting means for detecting the state in which the wire electrode led from the wire bobbin and stretched in the feeding route has stopped, and a release control unit for releasing the loosening preventive means from the retaining means in accordance with a command from the wire feeding stop detecting means so as to press the wire loosening preventive means to the outer winding peripheral surface of the wire electrode.

The wire feeding stop detecting means may also be constituted as a wire breaking detecting means for directly detecting the breaking state of the wire electrode.

In the present invention, when the wire electrode stops feeding due to the breaking of the wire or the like and the wire feeding stop detecting means detects this state, the detection signal is supplied to the release control unit, the release control unit immediately releasing the loosening preventive means from the retaining means, whereby the loosening preventive means presses the outer winding peripheral surface of the wire electrode.

The above and other objects, features and advantages of the present invention will become clear from the following description of the preferred embodiments thereof, taken in conjunction with the accompanying drawings.

DESCRIPTION OF THE PREFERRED EMBODIMENTS

Embodiments of the present invention will be explained hereinunder with reference to the accompanying drawings.

Figure 1:
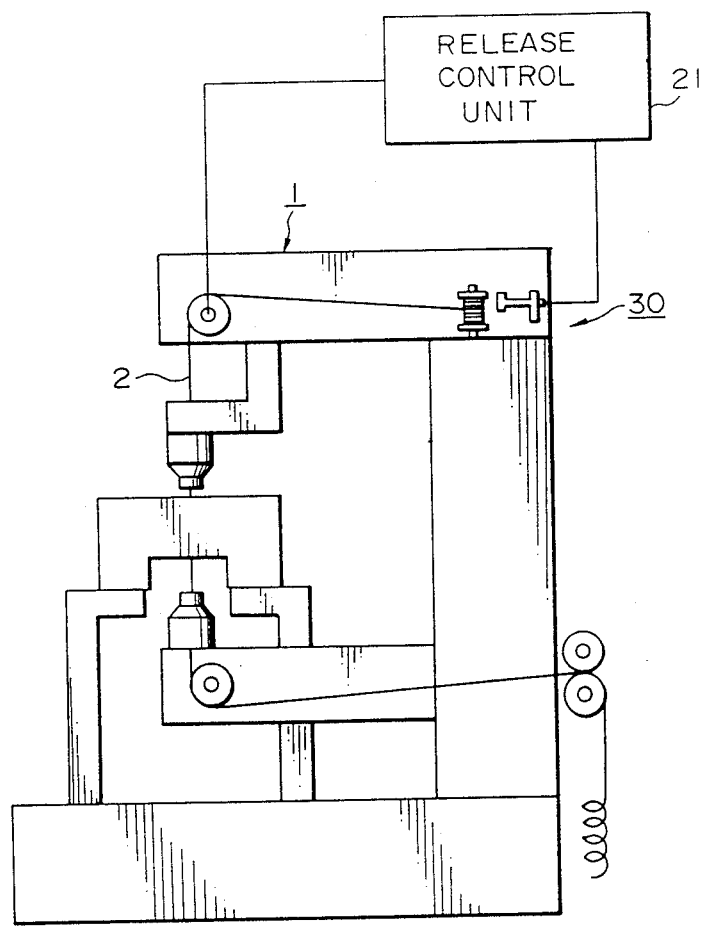
FIG. 1 schematically shows the entire structure of an embodiment of a wire electrical discharge machining apparatus according to the present invention.
Figure 10:
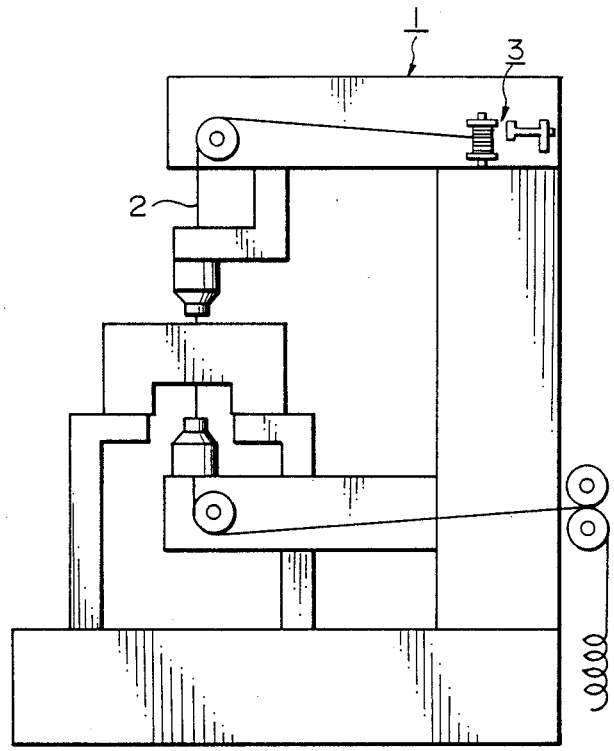
FIG. 10 shows the structure of a conventional wire electrical discharge machining apparatus.
Figure 11:
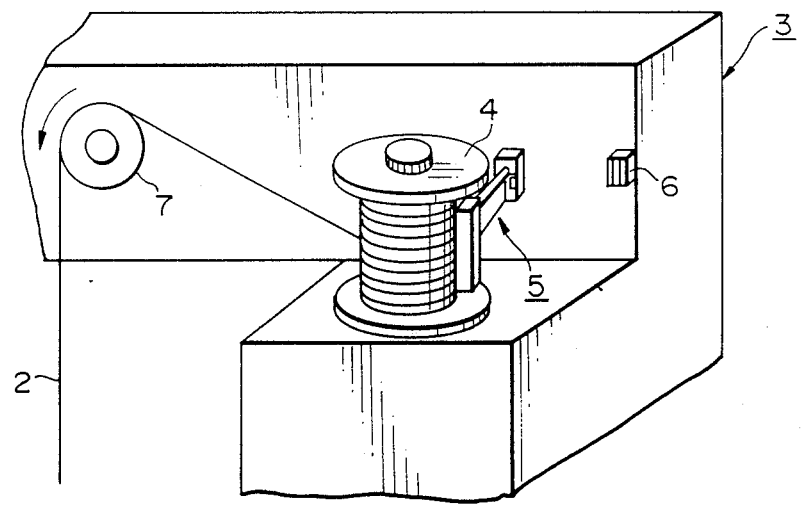
FIG. 11 is a detailed view of the conventional wire bobbin assembly shown in FIG. 10.
Figure 12:
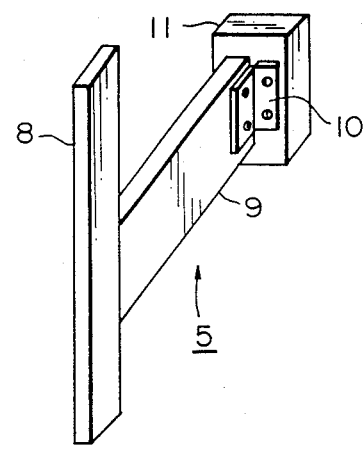
FIG. 12 is a detailed view of the conventional loosening preventive means shown in FIG. 11.

FIG. 1 shows the structure of a first embodiment of a wire electrical discharge machining apparatus. In FIG. 1, a wire bobbin assembly composed of a wire bobbin 1 with the wire electrode 2 wound therearound is represented by the reference numeral 3. In FIGS. 1 to 9, the same numerals are provided for the elements which are the same as those shown in FIGS. 10 to 12 showing a conventional apparatus, and explanation thereof will be omitted.

Figure 2:
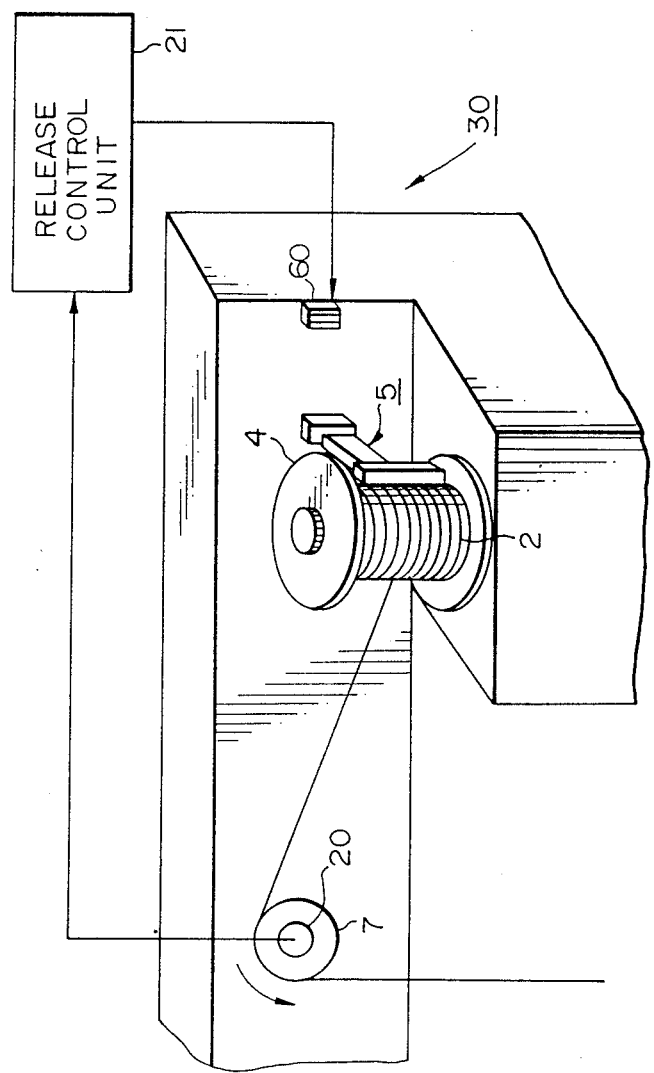
FIG. 2 is a perspective view of the details of a wire bobbin assembly shown in FIG. 1.

FIG. 2 shows the details of a wire bobbin assembly 30 of the first embodiment. In FIG. 2, a retaining means 60 for retaining the loosening preventive means 5 in the state of being apart from the wire bobbin 4 is provided. This embodiment is characterized in that a wire feeding stop detecting means 20 is provided on the rotational shaft of, for example, the wire tension reel 7 for detecting the state in which the wire electrode led from the wire bobbin and stretched in the feeding route has stopped. The wire feeding stop detecting means 20 adopts an encoder or the like for detecting the rotational state of the wire tension reel 7. In accordance with the feeding stop signal of the wire feeding stop detection means 20, a release signal is supplied from a release control unit 21 to the retaining means 60 in order to release the loosening preventive means 5 from the retaining means 60.

Figure 3A:
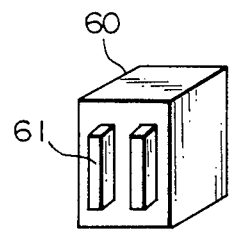
FIG. 3A is a perspective view of the retaining means shown in FIG. 2 in the state in which a magnet projects from the retaining means.
Figure 3B:
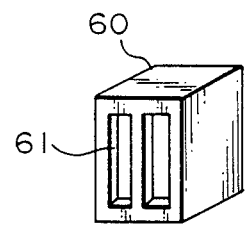
FIG. 3B is a perspective view of the retaining means shown in FIG. 2 in the state in which the magnet is stored in the the retaining means.

FIGS. 3A and 3B show the operational state of the retaining means 60, wherein FIG. 3A shows the state of the magnet 61 projecting from the retaining means 60 and retaining an attractive force toward the loosening preventive means 5, and FIG. 3B shows the state of the magnet 61 being stored in the retaining means 60 and having no retaining force acting on the loosening preventive means 5.

Figure 3C:
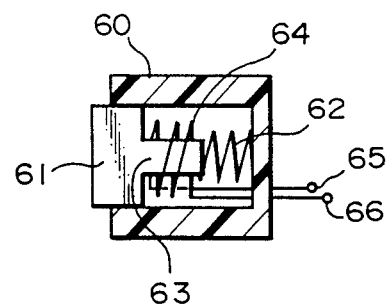
FIG. 3C is a perspective view of the inner structure of the retaining means shown in FIG. 2.

A preferred example of the retaining means 60 is shown in the sectional view of FIG. 3C.

In this example, the magnet 61 is horizontally slidably inserted in the case of the retaining means 60, and a compression spring 62 is inserted between the tail end of the magnet 61 and the inner wall of the case 60. In the ordinary state, the forward end of the magnet 61 projects outwardly from the case 60 so as to attract the arm or the presser plate of the loosening preventive means 5.

In this example, the tail end side of the magnet 61 has a plunger portion 63 having a smaller outer diameter and an exciting coil 64 is provided around the plunger portion 63.

To the exciting coil 64, an exciting signal is supplied from the release control unit 21 through terminals 65 and 66.

Therefore, as shown in FIG. 3C, when an exciting signal is supplied from the release control unit 21 through the terminals 65, 66 in the state in which the magnet 61 projecting from the case 60 is attracting the loosening preventive means 5, the magnet 61 is immediately drawn into the case 60, whereby the force attracting the release preventive means 5 is cancelled and the presser plate of the loosening preventive means 5 is brought into contact with the outer periphery of the wire electrode 2 around the bobbin 4 due to the release spring force.

In this way, the loosening preventive means 5 immediately presses the outer periphery of the wire electrode 2 in accordance with the release signal from the release control unit 21 and prevents the loosening thereof.

The signal supplied from the release control unit 21 is preferably a pulse exciting signal merely for drawing the magnet 61 into the case 60 for a very short time.

Figure 4:
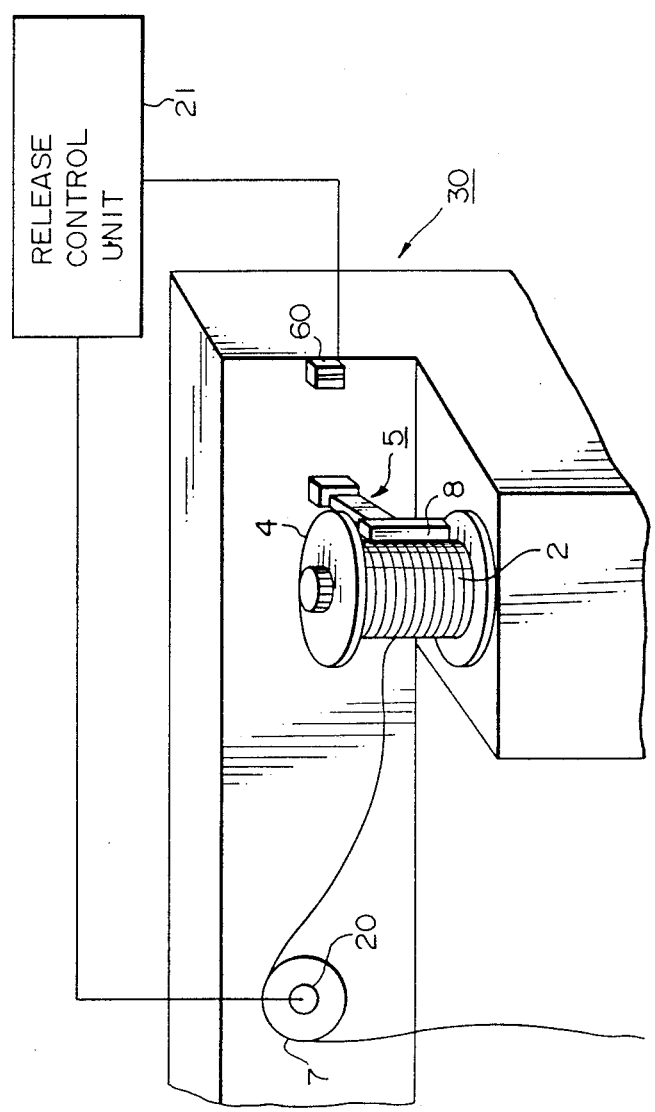
FIG. 4 is a detailed view of the operation of the wire bobbin assembly in the state in which the wire electrode stops feeding.

FIG. 4 shows the release preventive means 5 in the state of being released from the retaining means 60 and pressed toward the side of the wire bobbin 4 the moment the wire electrode 2 stops feeding.

As is clear from FIG. 4, even if the wire electrode 2 is in the state of loosening, the wire electrode 2 wound around the bobbin 4 is safely prevented from loosening by the presser plate 8 of the loosening preventive means 5.

Figure 5:
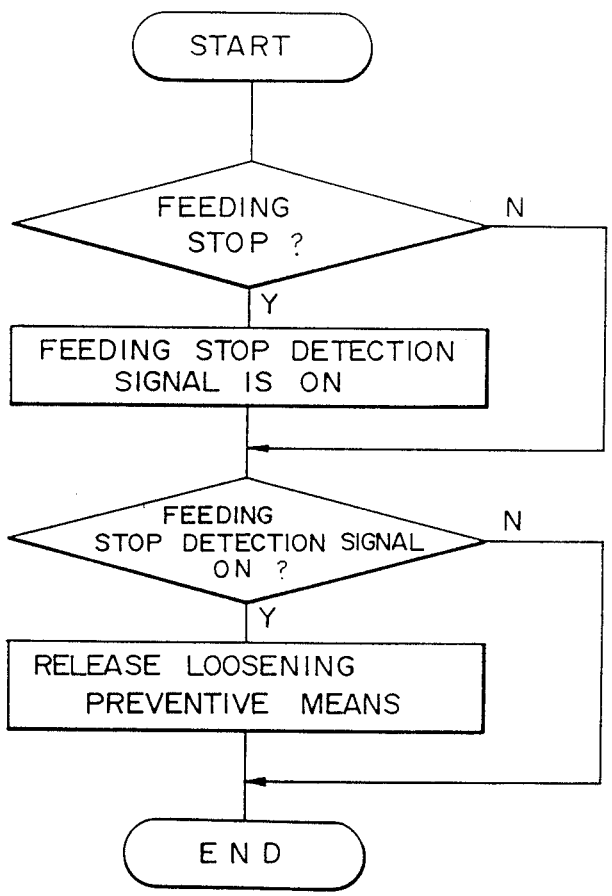
FIG. 5 is a flow chart explaining the operation of the embodiment shown in FIG. 1.

FIG. 5 is a flow chart of the operation of the loosening preventive means 5 of the embodiment shown in FIG. 1.

The operation will now be explained. Since the initial setting operation of the wire electrode 2 and the operation before electrical discharge machining are the same as in the conventional apparatus, explanation thereof will be omitted.

It is now assumed that during electrical discharge machining subsequently carried out after the initial setting, the wire electrode 2 assumes feeding stop state for some cause such as the breaking of the wire electrode 2. At this time, the wire tension reel 7 which has been rotating with the feeding of the wire electrode 2 then stops rotation. With the stop of the rotation of the tension reel 7, the encoder, which is the wire feeding stop detecting means 20, provided on the rotational shaft of the wire tension reel 7 also stops rotating, and the output signal becomes zero. The release control unit 21 receives this signal and the signal for storing the magnet 61 is supplied to the retaining means 60. In accordance with this signal, the retaining force of the magnet 61 which has been acting on the loosening preventive means 5 is immediately lost, and the loosening preventive means 5 immediately moves to the side of the wire bobbin 4 so as to be pressed against the outer winging peripheral surface of the wire electrode 2, thereby preventing the wire electrode 2 from bulging out of the wire bobbin 4. The operation during this time is shown in the flow chart of FIG. 5.

In this embodiment, the feeding stop of the wire electrode 2 is detected by the wire feeding stop detecting means 20 composed of an encoder which is provided on the rotational shaft of the wire tension reel 7, but the wire feeding stop detecting means 20 may be so constituted as a means for directly detecting the breaking state of the wire electrode 2. This structure is shown in FIGS. 6 to 9.

Figure 6:
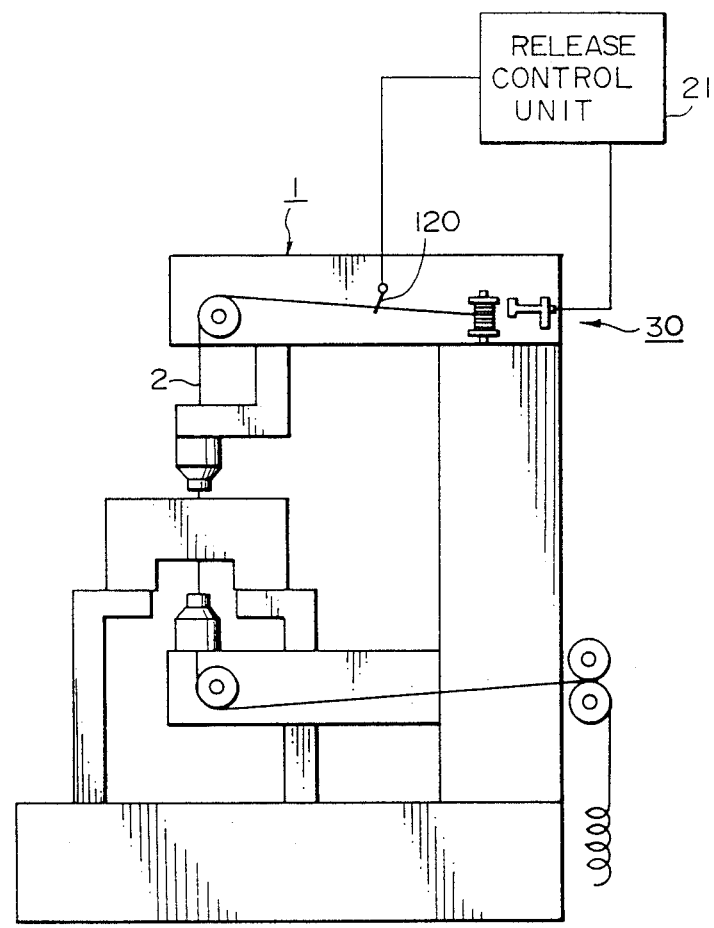
FIG. 6 shows the structure of another embodiment of a wire electrical discharge machining apparatus according to the present invention.
Figure 7:
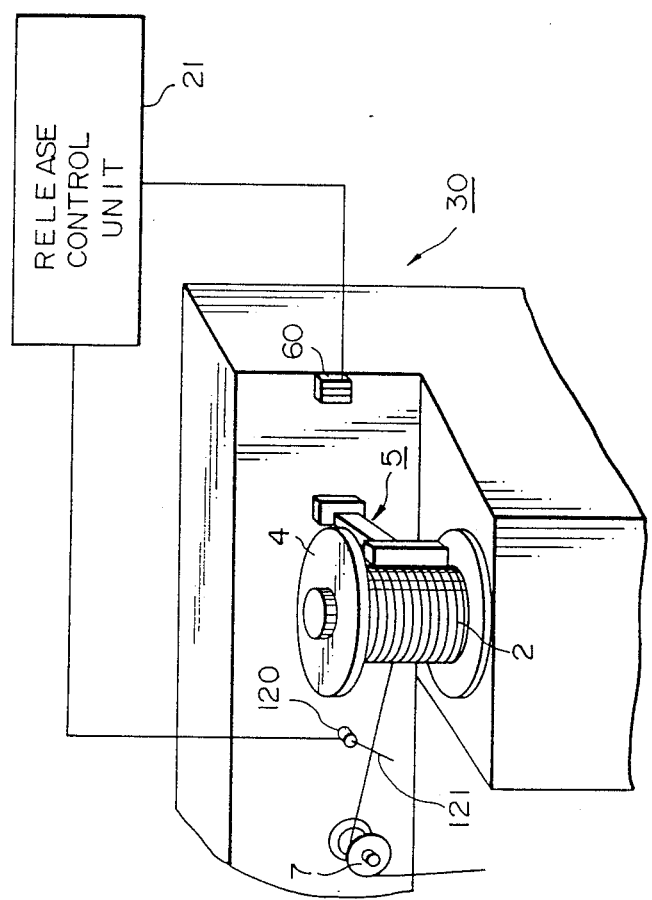
FIG. 7 is a detailed view of the wire bobbin assembly shown in FIG. 6.
Figure 8:
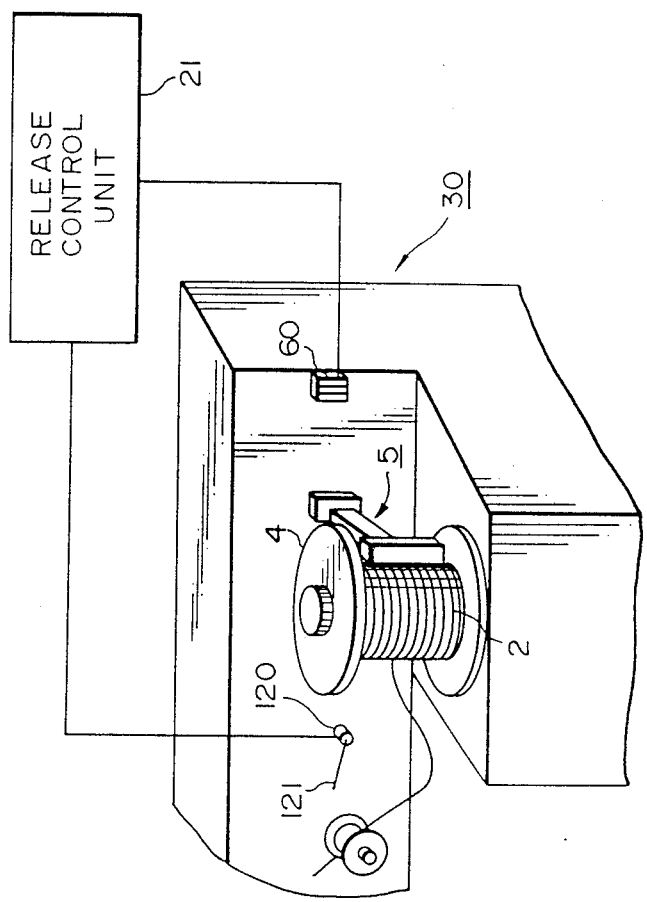
FIG. 8 is a detailed view of the operation of the wire bobbin assembly shown in FIG. 6 in the stat in which the the wire electrode is broken.
Figure 9:
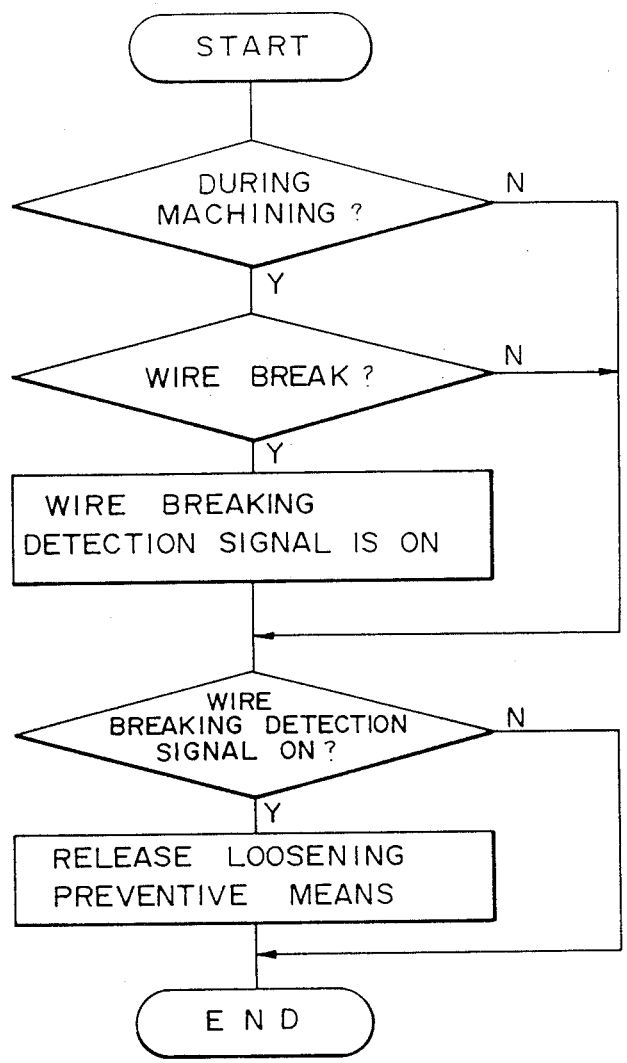
FIG. 9 is a flow chart of the operation of the embodiment shown in FIG. 6.

FIG. 6 shows the structure of a second embodiment of the present invention which is provided with another means for detecting the breaking state of the wire electrode 2. FIG. 7 is a detailed view thereof and FIG. 8 shows the operational state of the loosening preventive means 5 while the wire is broken. FIGS. 6, 7 and 8 correspond to FIGS. 1, 2 and 4, respectively. In these drawings, the reference numeral 120 represents a wire breaking detecting means for detecting the breaking state of the wire electrode 2 which is stretched in the feeding route. The wire breaking detecting means is composed of, for example, a limit switch. Since the other structure is the same as that shown in FIGS. 1 to 4, the same numerals are provided for the elements which are the same as those shown in FIGS. 1 to 4, and explanation thereof will be omitted.

In this embodiment, when a breaking of wire is produced on the wire electrode 2 for some cause during electrical discharge machining, the cantilever 121 of the wire breaking detecting means 120 which has been pressed down in the ON state by the stretching force of the wire electrode leaps up with the loss of the stretching force of the wire electrode, as shown in FIG. 8, and the ON state moves to the OFF state. This OFF signal is received by the release control unit 21, whereby the loosening preventive means 5 is released from the retaining means 60 so as to be pressed against the outer wiring peripheral surface of the wire electrode 2 in the same way as in the first embodiment. The operation during this time is shown in the flow chart of FIG. 9.

Although the encoder accommodated in the tension reel 7 or the limit switch provided on the feeding route is adopted for detecting the feeding stop of the wire electrode 2 in these embodiments, a device for detecting the feeding stop state or wire breaking state of the wire electrode 2 by a voltage applied to the wire electrode 2 during machining may be adopted instead, and other methods may also be usable.

The loosening preventive means 5 is operated by the spring force of the spring accommodated in the hinge 10 and the control of the ON/OFF of the magnet 61 by the retaining means 60. Alternatively, the arm 9 may be moved by air or other methods may be adopted to obtain similar effects to those of these embodiments.

As described above, according to the present invention, since the loosening preventive means is pressed against the outer wiring peripheral surface of the wire electrode immediately after the feeding of the wire electrode is stopped due to the breaking of the wire or the like, the wire electrode does not bulge out of the wire bobbin, thereby greatly enhancing the operability.

In addition, since the loosening preventive means presses the wire electrode against the wire bobbin, even if the wire bobbin races by the inertia or reversely rotates, the wire electrode does not bulge out of the wire bobbin, or even if the wire electrode leaps up from the wire tension reel, the wire electrode does not bulge out of the wire bobbin, thereby greatly enhancing the operability.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A wire electrical discharge machining apparatus comprising: a loosening preventive means (5) for pressing an outer winding peripheral surface of a wire electrode (2) wound around a wire bobbin (4), including means for biasing said loosening preventive means against said bobbin;
   a retaining means (60) for retaining said loosening preventive means in a position withdrawn from said wire bobbin;
   a wire feeding stop detecting means (20; 120) for detecting a state in which said wire electrode led from said wire bobbin and stretched in a feeding route has stopped feeding; and
   a release control unit (21) for releasing said loosening preventive means from said retaining means in response to a command from said wire feeding stop detecting means to press said wire loosening preventing means against said outer winding peripheral surface of said wire electrode and thereby prevent any wire backlash on the bobbin.

2. A wire electrical discharge machining apparatus according to claim 1, wherein said wire feeding stop detecting means (120) is a wire breaking detecting means for detecting a breakage of said wire electrode.

3. A wire electrical discharge machining apparatus according to claim 2, wherein said wire breaking detecting means is composed of an encoder for detecting the rotation of a wire tension reel (7).

4. A wire electrical discharge machining apparatus according to claim 1, wherein said wire feeding stop detecting means is composed of a limit switch (120) having a cantilever (121) which is maintained in the ON state by said wire electrode stretched in said feeding route.

5. A wire electrical discharge machining apparatus according to claim 1, wherein said retaining means includes a magnet (61) which attracts said loosening preventive means.

6. A wire electrical discharge machining apparatus according to claim 5, wherein said magnet is slidably provided in a retaining means case so as to attract said loosening preventive means when said magnet projects from said case and to release the attraction of said loosening preventive means when said magnet is stored in said case; and said retaining means further includes a magnet control means (64) for controlling said magnet so as to project from or to be stored in said case.

7. A wire electrical discharge machining apparatus according to claim 6, wherein said magnet controlling means is composed of an exciting coil provided in said retaining means case.

8. A wire electrical discharge machining apparatus according to claim 1, wherein said loosening preventive means includes an arm (9) which is rockably supported by a hinge (10) fixed on a wall, and a presser plate (8) provided at the forward end of said arm for pressing the outer periphery of said wire electrode wound around said wire bobbin.

* * * * *